Sept. 28, 1965    P. A. GUINARD    3,209,224
ELECTRIC MOTOR FED BY DIRECT OR RECTIFIED CURRENT
Filed Jan. 18, 1963    6 Sheets-Sheet 1

Sept. 28, 1965  P. A. GUINARD  3,209,224
ELECTRIC MOTOR FED BY DIRECT OR RECTIFIED CURRENT
Filed Jan. 18, 1963  6 Sheets-Sheet 3

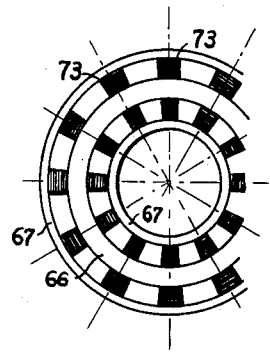
Fig. 12
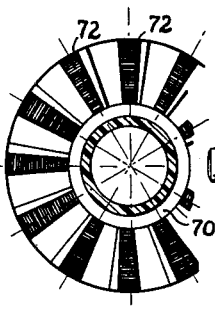
Fig. 13
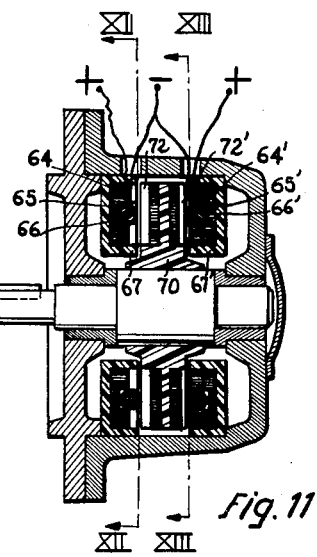
Fig. 11
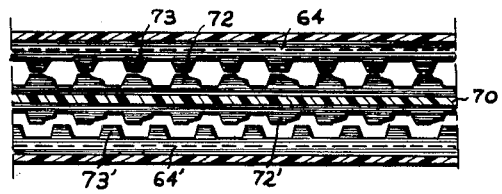
Fig. 15
Fig. 14
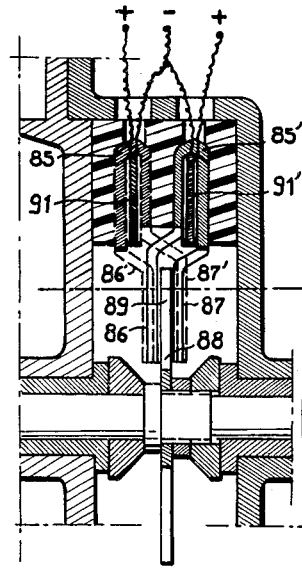
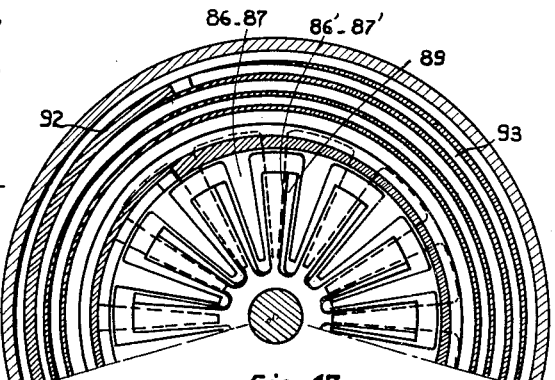
Fig. 17
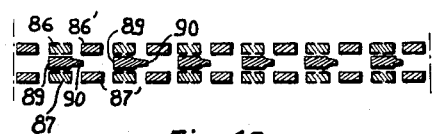
Fig. 16

United States Patent Office 3,209,224
Patented Sept. 28, 1965

3,209,224
ELECTRIC MOTOR FED BY DIRECT OR RECTIFIED CURRENT
Paul André Guinard, 6 Rue Montesquiou, Saint-Cloud, France
Filed Jan. 18, 1963, Ser. No. 252,354
Claims priority, application France, Jan. 23, 1962, 885,629
11 Claims. (Cl. 318—138)

The present invention relates to a new, variable reluctance electric motor supplied with direct or rectified current and in which the switching is effected by electronic means. More particularly, the invention is connected with a motor of this kind adapted, on the one hand to rotate at very low or high nominal speeds and on the other hand to supply a high starting torque and to permit speed variations within extremely wide limits under the effect of load variations, that is, to supply a driving torque itself varying within wide limits as a function of speed.

Variable reluctance motors are known in which there are provided an inductor formed by a wound magnetic circuit with projecting poles, and an armature formed by a non-wound and non-polarized magnetic circuit having projecting poles of soft iron, the inductor comprising two staggered or displaced windings supplied alternately by current impulses derived from a continuous current source, the switching of these windings being brought about by electronic means such as thyratrons or transistors generally controlled by mechanical, magnetic or electro-magnetic means linking the instaneous speed of the motor with the switching frequency of the supply circuit.

Nevertheless, none of these known means makes it possible to attain the result envisaged by the invention, that is, to achieve a high starting torque and a very extended variation of speed as a function of load. The deficiencies of the motors heretofore known is due to the fact that with all the known devices, the switching takes place at instants of time corresponding to a relatively unalterable position of the teeth of the rotor and the teeth of the stator. The result is that the possible increase of current in the windings brought about during an increase in load, by reducing the reluctance of the magnetic circuit due to the lag of the rotor teeth with respect to the speed of synchronism, is found to be strictly limited by the value of the reluctance corresponding to the switching position, so that the scale of speed variations is a very narrow one; in fact, when this increase in current is insufficient to create a driving torque corresponding to the increase in load, the motor stops.

The motor forming the object of the invention obviates this deficiency by providing, as a function of the load (and therefore of speed), an automatic adjustment of the relative position of the teeth of the stator and of the rotor in which the switching takes place, this result being obtained by an adaptation both of the magnetic circuit of the motor as well as of the supply circuit.

The motor according to the invention is characterized by the fact that, on the one hand the magnetic circuit of the motor is established so as to progressively vary its reluctance within wide limits in the major portion of each cycle corresponding to one rotation of a pole step, and that on the other hand means are provided to utilize the current variations in the inductor winding corresponding to the speed variations of the motor, in order to vary the release of the voltage impulses supplied by the oscillator.

According to a preferred embodiment of the invention, the motor comprises, in a manner known per se, two windings mounted in parallel on two different magnetic inductor circuits whose poles are staggered with respect to each other by half a pole step or pitch, and two different armature circuits whose poles are aligned, the poles of the armature having, in peripheral direction, a greater width than the poles of the inductor, as well as a radial height decreasing in the vicinity of their edge so as to create an air-gap which increases over a width corresponding to that where the poles of the armature overstep those of the inductor. The two inductor windings are fed alternately from a source of direct or rectified current, by a switching device comprising two power transistors controlled by an astable oscillator formed by two transistors controlling each other and each comprising a resistance/capacity circuit mounted between the collector of one and the base of the other, and their emitter circuits being connected respectively to the bases of the two power transistors (or directly to the windings of the motor in the event that the motors are of low power), while an air choke having a high surge voltage coefficient and mounted in series with the inductor wind-assembly is connected to the resistance/capacity circuits of the astable oscillator. The voltage impulses which are created by this choke at the moment of switching and whose value depends on the load of the motor, exercise an influence on the release of the discharge of the capacities of these circuits and thus establish an effective connection ensuring the automatic regulation of the frequency of the supply impulses as a function of the load on the motor.

Preferably, the magnetic circuits of the motor according to the invention will employ magnetic materials making it possible to obtain high induction values with weak magnetic fields without giving rise to high remanent induction.

By way of example, several embodiments of the motor according to the invention and the electric circuits of the corresponding supply means are described below and shown in the accompanying drawing in which, FIG. 1 is an axial half-section of the motor according to the invention, and FIG. 2 a partial cross-section.

FIG. 11 is a view in axial section of another embodiment of the motor according to the invention, while FIGS. 12 and 13 are cross-sections along lines XII and XIII—XIII of FIG. 11.

FIG. 14 is a developed view of the magnetic circuit of this motor.

FIG. 15 is an axial half-section of another embodiment of the motor having a flat air-gap.

FIG. 16 is a developed view of the magnetic circuit of this motor.

FIG. 17 is a side elevation of the stator comprising a printed circuit.

Figure 1:
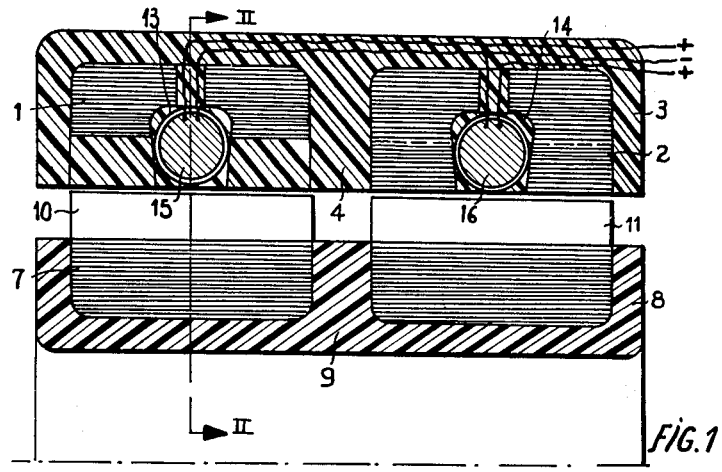
Figure 2:
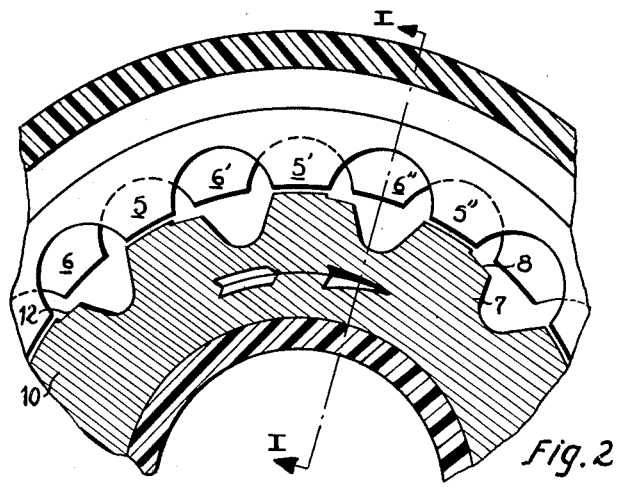
Figure 4:
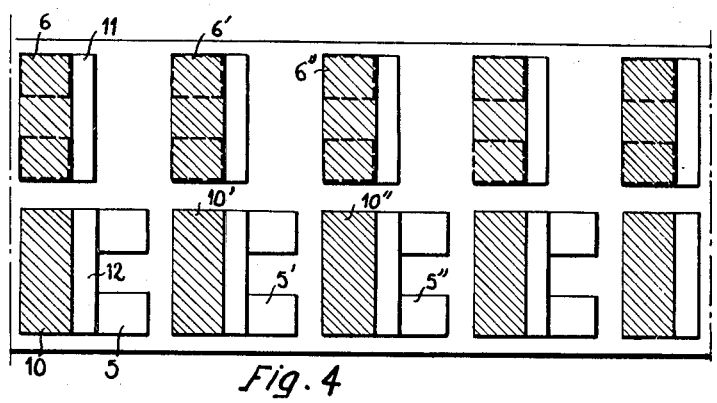

As indicated in FIGS. 1 and 2, the magnetic circuits of the arrangement according to the invention are constituted by two variable reluctance units which are preferably magnetically insulated from each other. In the example shown, the stator is formed by two rings of soft magnetic material 1 and 2 encased for example by a cover 3 of plastic material, preferably of the thermosetting type, adapted to ensure a rigid assembly and not liable to cause any magnetic or electric leakage, the center portion 4 of this cover forming a partition separating the rings 1 and 2. The two circuits thus fixed preferably have a spacing of a few millimetres between them so as to void any reciprocal magnetic influence. The assembly thus formed may be mounted in any suitable manner in a casing of the motor. The two magnetic rings 1 and 2 may be obtained in practice by means which require no complicated tooling, that is with the aid of pressed and sintered soft ferro-magnetic materials or in accordance with the technological principles employing metallic oxides such as nickel-zinc or manganese ferrites whose essential characteristics are to ensure a very low remanent induction. These rings are provided internally with projecting poles in the form of teeth, respectively 5, 5', 5" . . . and 6, 6', 6" . . . , the two stators being staggered by half a pole step or pitch, as indicated in FIG. 2.

Opposite the two half-stators 1 and 2, the circuits comprise two half-rotors 7 and 8, preferably formed of a soft magnetic material identical with that of the stators. Just as in the case of the stators, they are preferably mounted in a cover of plastic material 9 so as to be insulated magnetically from each other. The two rotors thus formed are provided at their peripheries with projecting poles 10 and 11 situated in alignment with each other and equal in number to those of the stator, or at least equal to a multiple or sub-multiple of the latter. As will be apparent from FIG. 2, the poles 10, 11 of the rotor have a greater peripheral width than those of the stator. In the vicinity of one of their edges, they have a lesser radial height than in the remaining portion where their width is equal to that of the poles of the stator. In this portion 12 of less height, the teeth of the rotor have a slightly conical shape, so as to create a more effective but progressively decreasing air-gap when this portion passes in front of the teeth of the stator.

At their inner face, the two stators 1 and 2 have a circular groove 13, 14 each of which houses a winding 15, 16 formed by a toroidal coil formed of annular turns of insulated wire, which for example is enamelled and is wound concentric with the axis of the motor, so that the magnetic flux lines close in radial planes around the winding, across the stator, the air-gap and the rotor.

By virtue of this arrangement and the shape of the teeth of the rotor, the motor starts automatically when two current impulses are passed successively into the two windings 15 and 16. If, when at rest, the motor actually finds itself in the position indicated in FIG. 2 in which the high portion of the rotor teeth is opposite the teeth 5 of the half-stator 1, the transmission of a current impulse into the coil 16 of the stator 2 brings about an attraction between the teeth 6' of this stator and the portion 12 of the teeth 10 of the rotor which is approaching these teeth 6'. The result is that the rotor moves so that the high portion of the rotor teeth comes opposite the teeth 6' of the stator 2. If at this moment the current is cut off in winding 16 and switched on a winding 15, the same action brings about a fresh displacement of the rotor, and so on. If on the other hand, the rotor finds itself more or less displaced with respect to the position shown in FIG. 2 when the motor is at rest, a first current impulse, for example in the winding 15 of the stator 1, will bring back the rotor into the position of minimum reluctance as in FIG. 2 and the succeeding impulses will initiate the starting of the motor in the manner described above. It will be noted that the motor thus conceived, always starts in the same direction (that indicated by the arrow in FIG. 2) no matter what the sense of the current in the windings. This avoids all possibility of the motor being wrongly mounted. On the other hand, in order to reverse the direction of rotation of the motor, it is necessary to turn the rotor around, end for end.

Figure 5:
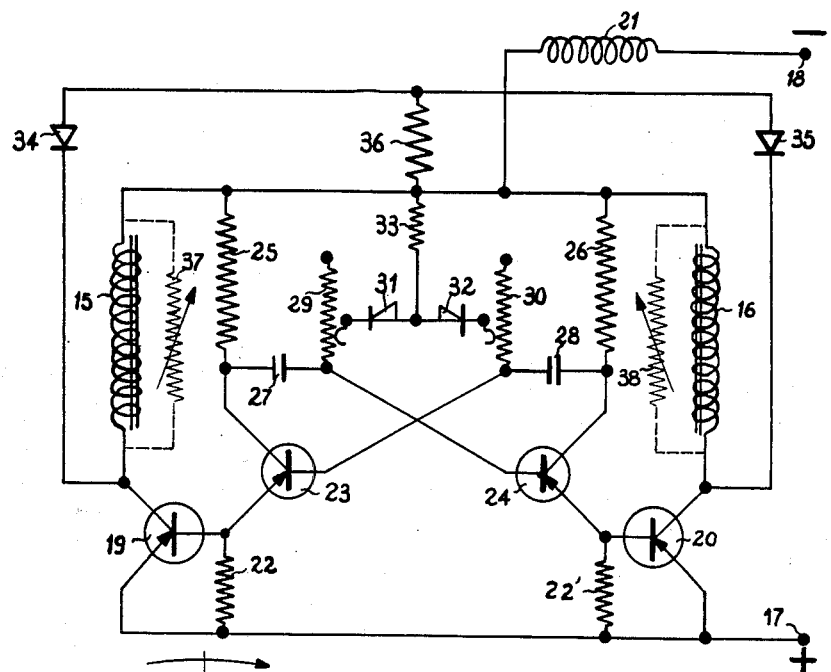
FIG. 5 is the wiring diagram of the entire supply and control circuits.

The automatically connected current supply system forming an object of the invention is shown in FIG. 5. It is adapted to switch a direct current or a filtered rectified current and to successively transmit unidirectional currents to each of the coils 15, 16 of the motor which are connected in parallel between the terminals 17 and 18 and the source of supply. Each motor winding 15, 16 lies in series with the collector of the power transistors 19, 20 and they are both joined to the minus pole, in series with an air choke whose function will be described in detail below.

In the wiring diagram, these transistors 19, 20 are chosen from the PNP type. The emitters of these two transistors are connected to the positive terminal 17 of the supply source. Their bases are joined on the one hand to the positive pole by blocking resistances 22, 22' and on the other hand to the emitters of the oscillator transistors 23, 24, also performing the role of amplifiers in the circuit arrangement shown. The collectors of these oscillator transistors 23, 24 are connected in series with a resistance 25, 26 limiting the control current of the power stage to a value acceptable to the oscillator transistors 23, 24. It will be observed that it is important to arrange that this resistance has a sufficiently low value as to saturate the base of the transistor of the power stage, whatever the current gain of this latter. The base of each of the transistor oscillators 23, 24 is connected to the collector of the other one through the medium of a capacitor 27, 28 and to the negative pole through the medium of resistances 29, 30, which in this particular case are effective to permit the regulation of the astable oscillator in a manner known per se. The two oscillator transistors will therefore operate alternately with one blocked and the other conducting, under the action of the successive charging and discharging of the two capacitors 27 and 28. This system will oscillate immediately when the circuit is put under voltage, because there is always present a resistance or capacity unbalance in one of the R.C. groups with respect to the other one. The frequency of the desired oscillations will be obtained by simultaneously varying the resistances 29, 30, which are mechanically coupled for example, since the operation of such an oscillator is equal to $F=0.7R \times C$. Two thermistors 31 and 32 are placed in series with the resistances 29, 30 of the R.C. networks so as to bring about automatically (and for a short period during the application of voltage to the circuit) an increase in the time constant of the oscillator and hence a lowering of the frequency of the oscillations during starting, so as to promote the coupling action with the motor which will be described below. A resistance 33 enables the mean level of the operating voltage of the R.C. networks to be adjusted.

Two diodes 34 and 35 are connected in parallel across each of the windings 15, 16 of the motor and in series with a resistance 36 common to both windings. During the transmission of a current impulse in a coil of the motor, an appropriate disposition of the diode prevents this current from traversing the resistance 36. On the other hand, after this current is cut off, the energy stored up in the coil and the magnetic circuit may dissipate itself in the resistance 36, the current then being damped in a closed circuit comprising in series the coil 15 for example, the corresponding diode 34 and the resistance 36 common to both circuits. It should be noted that the energy stored in a coil and in its magnetic circuit will produce a voltage surge during break of circuit, this surge being a function of the switching speed of the transistor. The diode and resistance system described is for the purpose of limiting this surge to a value acceptable by the transistor, but it is important to arrange that this resistance is also sufficiently high to render the surge voltage acceptable by the semi-conductor in order that the current continuing to flow after the circuit-breaking in a coil of the motor does not bring about a remanent field adapted to cause braking of the machine.

This problem may also be solved by discarding the diodes 34, 35 as well as the resistance 36 and by replacing them by thyrites 37, 38 or resistances variable with voltage, connected in parallel with the windings of the motor. The characteristics of these thyrites may be chosen so that their resistance is very high under the sole direct voltage (thus creating no negligible loss) but drops rapidly as soon as a surge voltage appears, thus bringing about an action substantially identical with that which takes place with the diodes and resistances in series.

Finally the whole assembly thus defined above is connected in series with the air choke 21 which has—for a given motor—well defined characteristics from the point of view of resistance, number of turns and its geometric shapes, these characteristics being defined as a function of the connection requirements which will now be dealt with.

Figure 6:
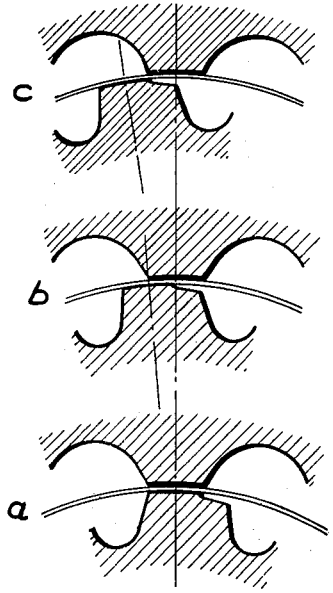
FIGS. 6 to 10 are diagrams illustrating the mode of operation of the motor according to the invention.
Figure 7:
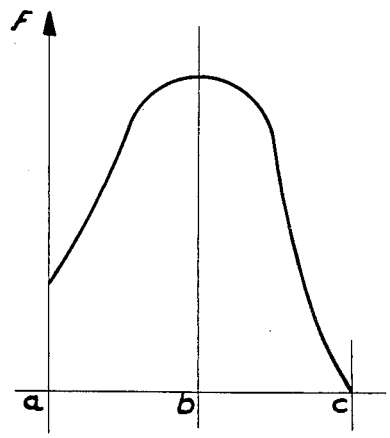

If one examines the curve of the couple produced by a magnetic circuit of variable reluctance such as that used in a machine according to the invention, namely in the presence of a constant induction in the static state, it will be found that the different relative positions $a$, $b$, $c$ of the poles shown in FIG. 6 will correspond with the curve of FIG. 7 where the angular lags are shown as abscissae and the tangential forces as ordinates.

It will therefore be realized that any increase in the resisting efforts on the motor will translate itself into a value determined from the tangential force defining the angular lag which the toothing of the rotor is capable of asuming. Very different states of reluctance will correspond with these different lag positions of the toothing of the rotor and these very different states of the reluctance will make it possible to attain a higher and more rapid current establishment curve, as a function of an increasing lag of the rotor under the action of a load.

Supposing that for the nominal speed at zero load on the motor, the voltage impulse is applied in position $a$, then this voltage impulse 37 (FIG. 8$a$) will produce in the corresponding winding 15, 16 of the inductor, a current having the outline of the curve 38 and producing at the terminals of choke 21 a voltage represented by curve 39 (FIG. 9$a$) which determines the corresponding discharge curve 40 (FIG. 10$a$) of condenser 27, this discharge being released at the instants $t_1$, $t_2$ . . . while the discharge of condenser 28 takes place in accordance with curve 40′ and is released at the instants $t'_1$, $t'_2$ . . . the difference $t_2-t_1$ defining the frequency of the supply impulses.

Figures 8A, 8B, 9A, 9B, 10A, 10B:
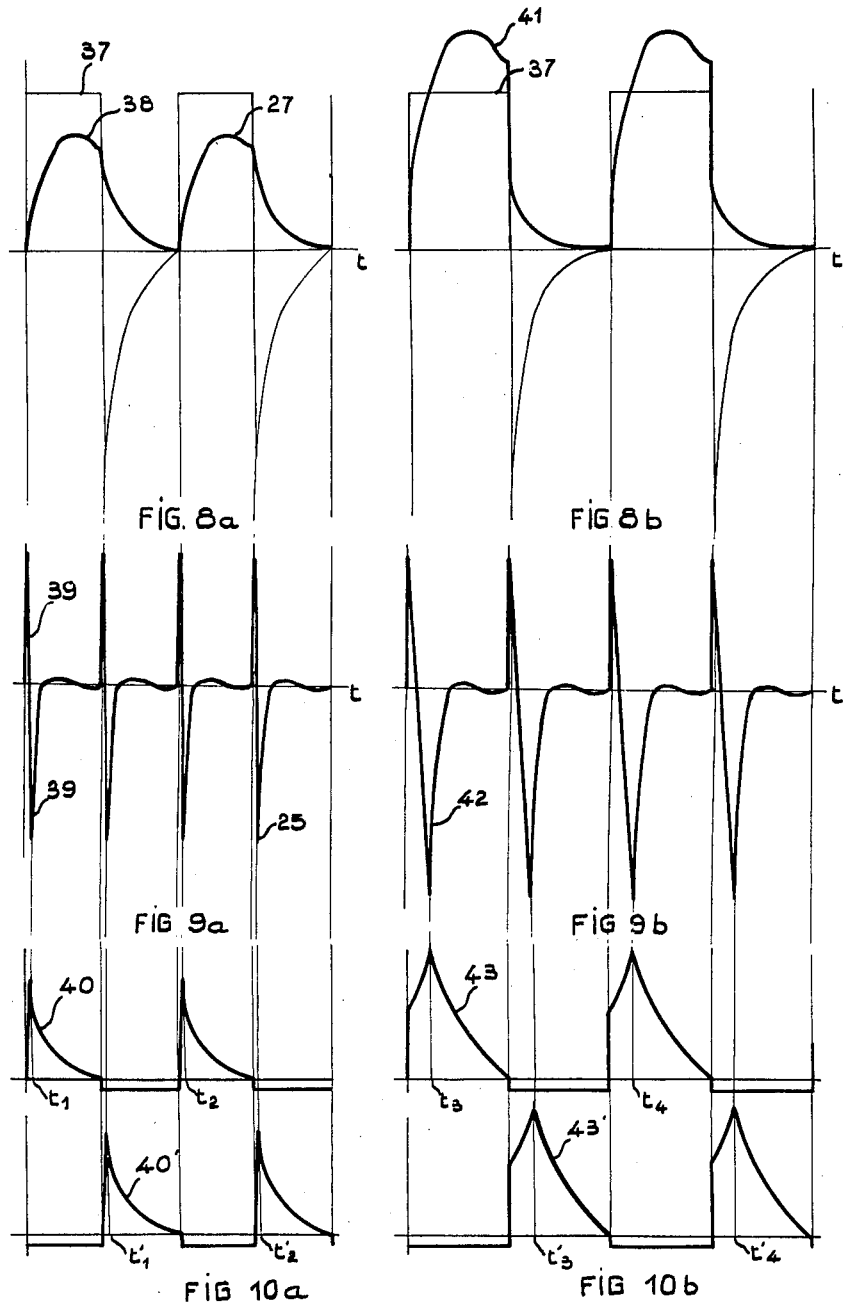

If the load should happen to increase, the speed of the rotor diminishes and the lag of the rotor has the effect for example that the voltage impulse 37 is released at the moment when the relative position of the stator and of the rotor matches with position $b$ corresponding to an increased reluctance of the magnetic circuit. The current in the inductor consequently assumes the outline of curve 41 (FIG. 8$b$), and attains a more powerful intensity, whereas the voltage at the terminals of the choke 21 establishes itself in accordance with curve 42 (FIG. 9$b$). The result is that the discharges of the condensers 27, 28 are delayed (curves 43 and 43′ of FIG. 10$b$) and are released at the instants $t_3$, $t_4$ . . . $t'_3$ . . . $t'_4$ and the impulse frequency supplying the motor is lowered in inverse proportion to the increase in the difference $(t_4-t_3)$ with respect to $(t_2-t_1)$.

Note should be taken of an additional advantage of the motor just described, namely that its operation is influenced relatively little by the variations of the supply voltage which has but slight influence on the speed of the motor and translates itself merely into a diminution of the torque.

The use of magnetic materials having a high Curie point for the construction of the motor according to the invention (the coils being suitably insulated by means of thermosetting plastic materials which are resistant to high temperatures and may be easily cooled) enables operation at temperatures of the order of 450° to be envisaged.

On the other hand, in the event of stoppage of the motor in any position, the maximum possible current absorbed by the motor is defined (and limited in the most unfavorable case where the teeth of one of the portions of the rotor find themselves at the middle of the gap separating the teeth of the corresponding stator) by the current establishment curve in the coil 21, in the corresponding state of self-induction. Therefore, having taken the necessary precautions with regard to construction, the motor may be left under voltage in the blocked condition, without any danger to itself or its control.

FIGS. 11 to 14 show another embodiment of the motor according to the invention in which the air-gaps are flat instead of being cylindrical, and are situated in planes transverse to the axis of the motor. With this object, the magnetic rings 64 and 64′ forming the two half-stators are provided at their mutually opposite faces with lateral circular grooves 65, 65′ forming housings for toroidal windings 66, 66′, these two magnetic rings being accommodated in rings of insulating material 67, 67′, preferably of thermosetting plastic material, and having a recumbent U-shaped cross-section. The two half stators 64, 64′ thus formed are mounted in the casing 68 of the motor with a certain spacing between them, so that the two half-rotors 69, 69′ may be accommodated within the free space included between these half-stators. The two half-rotors 69, 69′ are supported by an insulating plastic means 70 integral with a disc 71 whose two faces provide attachment for these rotors 69, 69′. The latter carry teeth 72 protruding laterally on these two discs and having a shape similar to that shown in FIG. 2. Similarly the two stators 64, 64′ are provided with poles in the form of teeth 73, 73′ protruding laterally towards the interior and having a width equal to that of the top portion of the teeth 72, 72′ of the rotors. As previously, the poles of the two stators are staggered by half a pole pitch, while the numbers of teeth in the two stators and the two rotors are identical.

Figure 3:
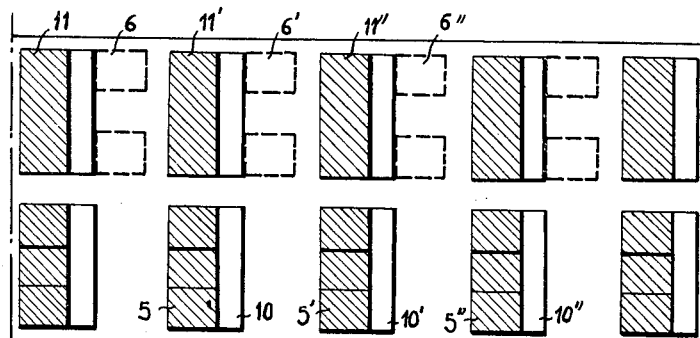
FIGS. 3 and 4 are developed views indicating the poles of the stator and of the rotor in different relative positions.

FIG. 15 again shows an embodiment of a flat transverse airgap. In this embodiment, the two half-stators are constituted by sheet metal rings 85, 85′ shaped so as to have, in radial section a flattened U-form open towards the inside. The edges of the two half-stators 85, 85′ are cut away to form alternate poles 86, 87 and 86′, 87′, the notched edges of the two rings being folded back and intersected in such a way that the rotor formed by a sheet metal disc 88 finds itself located between two series of alternate poles belonging respectively to the two half-stators. This motor 88 is cut away at its edge so as to form poles 89 having a peripheral width greater than that of the poles 86 and 87 of the stators and a thinned down front edge 90 (FIG. 16) adapted to ensure the starting of the motor always in the same direction, under the same conditions as the poles of decreasing height in FIGS. 1 and 3.

The windings 91, 91′ of the stator lodged in the two U-shaped rings 85 and 85′ may be formed, as in the proceeding embodiments, by toroidal coils of enamelled wire with the turns wound concentrically with respect to the axis of the motor. However, this embodiment lends itself readily to the adoption of windings produced according to the printed circuit technique. For this purpose, as shown in FIG. 17, this winding is constituted by a flat ring of insulating material 92 upon which a copper spiral 93 is stuck or printed, preferably on both its faces, the spirals of the two faces being joined, preferably at the end of their inner turns, by a connecting piece crossing the disc 92, the sense of the two spirals being suitably chosen so as to produce a flux in the same direction.

The motor in accordance with the invention is particularly applicable to installations in which the electric motor must be submerged in a liquid, especially in water, or for driving pumps without being isolated from the hydraulic circuit by a stuffing box. As a matter of fact in this case, the interior of the motor and in particular its airgap, is filled with water. The provision of magnetic circuits of ferrite embedded in supports of plastic material makes it possible for the motor according to the invention, to operate in water, without the necessity for adopting measures to electrically insulate the rotor from the stator. On the contrary, since the water possesses a specific inductive power very much higher than that of air, it is possible to increase the airgap by a considerable amount while still retaining magnetic circuits of even weaker reluctance than in the case of air, thus resulting in a higher torque.

Figure 18:
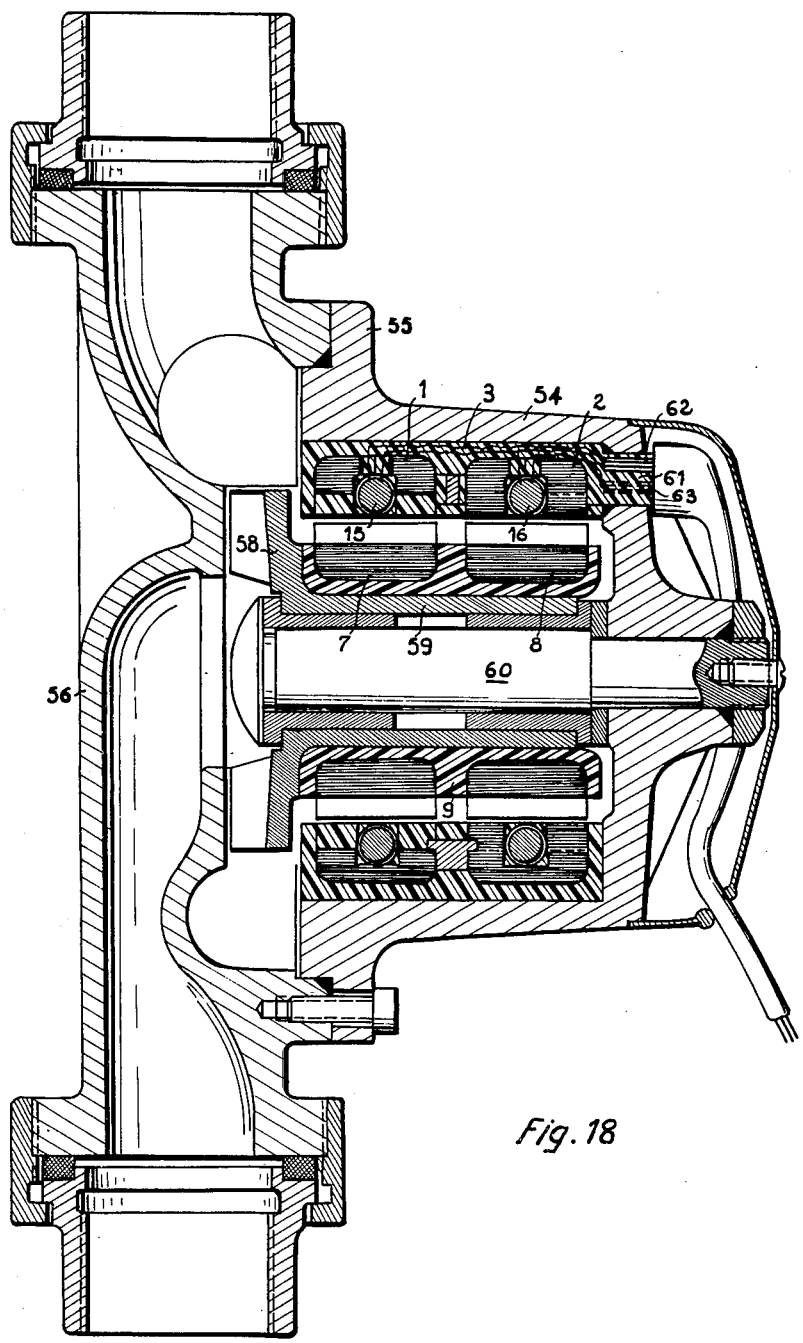
FIG. 18 is a view in axial section of the motor in accordance with FIGS. 1 to 4, in its application to a pump drive, the motor not being isolated from the pumped liquid by a stuffing box.

As shown in FIG. 18, the cover of plastic material 3 in which the two half-stators 1 and 2 are housed, is itself accommodated in the outer casing 54 of the motor. At one end, this casing is provided with a flange 55 by which it is connected with a pump 56 whose rotor 58 is integral with a sleeve 59 mounted on the shaft 60 of the motor, the sleeve itself supporting the ring of plastic material 9 in which the rotors 7 and 8 are wound. The windings 15 and 16 of the stator are fed by conductors traversing the casing through a piece of plastic material 61 which forms part of the insulating ring 3 and is provided with two channels 62, 63 to give passage to the supply conductors. The mounting of the magnetic circuit in supports of plastic material, both on the fixed portion as well as the rotating portion of the motor, not only offers facilities for insulation and protection against corrosion, but also has the advantage of reducing considerably the transmission of vibrations to the fixed portions of the installation.

I claim:

1. In the combination comprising a variable reluctance motor having an inductor constituted by a magnetic circuit including a first group of projecting poles and a field winding, and an armature constituted by a non-wound and a non-polarized magnetic circuit with a second group of projecting poles, and means for feeding said winding of said inductor from a DC source and comprising an astable oscillator including an RC circuit for delivering unidirectional voltage impulses of which the frequency is determined by said RC circuit, means for controlling said frequency according to the load of the motor, the latter said means comprising an arrangement of the pole structure of the magnetic circuit of the motor adapted to cause the reluctance thereof to be progressively varied in each cycle corresponding to a rotation by one pole pitch during a rotation of about half of said pole pitch between the positions wherein the rear edges of the poles of the stator are aligned with the forward edges and with the rear edges of the poles of the rotor respectively, and circuit means connected in series with the winding of the inductor to provide a voltage variation across its terminals due to the variation of the current intensity in said winding depending upon load and speed variation of the motor, said circuit means being connected to the RC circuit of the oscillator to control the release of the voltage impulses supplied by said oscillator.

2. In the combination according to claim 1 wherein the circuit means connected in series with the inductor winding is a choke.

3. In the combination according to claim 1 wherein said variable reluctance motor comprises a rotor having one of said group of projecting poles thereon, a stator having the other of the group of projecting poles equiangularly disposed thereon, said stator and rotor poles respectively forming part of a magnetic circuit, said rotor poles having a circumferential length greater than that of the stator poles and a diminishing dimension over a part of their circumferential length in the intended direction of rotation of said rotor such that the reluctance of said magnetic circuit is variable as a function of the angular position of said rotor.

4. In a combination according to claim 1 wherein said variable reluctance motor comprises a stator constituting said inductor and comprising two magnetically insulated parts each having one of said groups of projecting poles equiangularly disposed thereon, both said parts of the stator being shifted one with respect to the other by an angle equal to a half of the pole pitch, said field winding including two windings associated with both said stator parts respectively, and a rotor constituting said armature comprising also two magnetically insulated parts made of non-polarized magnetic material associated with both said stator parts respectively and provided with the other of the groups of projecting poles equiangularly disposed thereon, said armature poles of both parts thereof being respectively aligned with one another.

5. In the combination according to claim 1 wherein said variable reluctance motor comprises two rotor parts mounted for simultaneous rotation about an axis and insulated from each other, each rotor part having the projecting poles of one of said groups equiangularly disposed about said axis with the poles of one rotor part aligned with those of the other rotor part, a separate stator part associated with each rotor part, each stator having the projecting poles of the other of said groups arranged thereon in spaced relationship with respect to the poles of the associated rotor part, the ratio of the number of poles of one of the stator parts and the associated rotor part to the number of poles of the other of the stator parts and the associated rotor part being an integral number including unity, the poles of one stator part being angularly staggered about said axis with respect to the poles of the other stator part by one-half a pole pitch, the poles of each stator part and the poles of the associated rotor part forming part of a magnetic circuit, the poles of each rotor part having a circumferential length greater than that of the poles of the associated stator part and having a diminishing dimension in the intended direction of rotation of the rotor parts such that reluctance of the magnetic circuit is variable as a function of the angular displacement of the rotor parts relative to the stator parts, said astable oscillator being connected to said stator windings to provide unidirectional voltage pulses alternatively to each stator winding, said circuit means including an air choke connected in series between a terminal of the DC source and the stator windings which are connected in parallel to the other terminal of the source.

6. In the combination according to claim 1 wherein said variable reluctance motor comprises two cylindrical rotor parts mounted for simultaneous rotation about an axis and insulated from each other, each rotor part having the projecting poles of one of said groups equiangularly disposed about said axis in radially and outwardly extending relation with the poles of one rotor part aligned with those of the other rotor part, a separate annular stator part associated with each motor part, each stator part having the poles of the other of said groups arranged inwardly thereon in spaced relationship with the poles of the associated rotor part, the ratio of the number of poles of one of the stator parts and the associated rotor part to the number of poles of the other of the stator parts and the associated rotor part being an integral number including unity, the poles of one stator part being angularly staggered about said axis with respect to the poles of the other stator part by one-half a pole pitch, the poles of each stator part and the poles of the associated rotor part forming part of a magnetic circuit, the poles of each rotor part having a circumferential length greater than that of the poles of the associated stator part and having a diminishing radial dimension in the intended direction of rotation of the rotor parts such that the reluctance of the magnetic circuits is variable as a function of the angular displacement of the rotor parts relative to the stator parts, the annular stator parts having on the inner face thereof a groove and provided with two windings accommodated in said groove respectively, said astable oscillator being connected to said stator windings to provide unidirectional voltage pulses alternatively to each stator winding, said circuit means including an air choke connected in series between a terminal of the DC source and the stator windings which are connected in parallel to the other terminal of the source.

7. In the combination according to claim 1 wherein said reluctance motor comprises two cylindrical rotor parts mounted for simultaneous rotation about an axis and insulated from each other, each rotor part having the projecting poles of one of said groups equiangularly disposed about said axis in radially and outwardly extending relation with the poles of one rotor part aligned with those of the other rotor part, a separate annular stator part associated with each rotor part, each stator part having the poles of the other of said groups arranged inwardly thereon in spaced relationship with respect to the poles of the associated rotor part, the ratio of the number of poles of one of the stator parts and the associated rotor part to the number of poles of the other of the stator parts and the associated rotor part being an integral number including unity, the poles of one stator part being angularly staggered about said axis with respect to the poles of the other stator part by one-half a pole pitch, the poles of each stator part and the poles of the associated rotor part forming part of a magnetic circuit, the poles of each rotor part having a circumferential length greater than that of the poles of the associated stator part and having a diminishing radial dimension in the intended directon of rotation of the rotor parts such that the reluctance of the magnetic circuit is variable as a function of the angular displacement of the rotor parts relative to the stator parts, the annular stator parts having on the inner face thereof a groove and provided with a winding in each said groove respectively, said astable oscillator comprising two resistance-capacity coupled transistors, a pair of power transistors each having a separate one of the stator windings connected thereto, an electrical connection between the emitter electrodes of each of said coupled transistors and the base electrode of said power transistors, of which the emitter electrodes are connected to one of the terminals of the DC source, said circuit means comprising an air choke electrically connected in series between the other terminal of the DC source and one end of both inductor windings, said choke being also connected to the resistors of the RC circuit of the oscillator transistors, whereas the other ends of said windings are connected to the collector electrodes of said power transistors respectively.

8. In the combination according to claim 7, a resistance having a variable magnitude which is responsive to the voltage applied thereacross connected across each stator winding.

9. In the combination according to claim 7, a unidirectional current conducting device connected across each stator winding.

10. In the combination according to claim 7 comprising, in the RC circuits of said oscillator, adjustable resistor means for selecting the oscillation frequency, and thermistor means operable to increase the frequency once said oscillator is started.

11. A variable reluctance motor comprising an inductor including a first group of projecting poles and a field winding, an armature including a second group of projecting poles, said armature and inductor constituting a magnetic circuit, said groups of poles being arranged adjacent one another for relative movement, said groups of poles having surfaces in spaced non-uniform relation such that the magnetic circuit has variable reluctance during said relative movement, a source of direct current, means for feeding said winding of said inductor from said source of direct current, the latter means comprising an astable oscillator including an RC circuit for delivering unidirectional voltage impulses to the inductor winding of which the frequency is determined by said RC circuit, and frequency control means for controlling said frequency according to the load of the motor, the frequency control means comprising circuit means connected in series with the winding of the inductor to provide a voltage variation across its terminals due to variations of the current intensity in said winding, said current intensity variation resulting from variation of reluctance in the magnetic circuit as caused by load and speed variation of the motor, said circuit means being connected to the RC circuit of the oscillator to control the release of the voltage impulses supplied by said oscillator.

References Cited by the Examiner

UNITED STATES PATENTS

| 2,814,769 | 11/57 | Williams | 318—341 |
| 2,912,653 | 11/59 | Tillman | 307—88.5 |
| 2,995,690 | 8/61 | Lemon | 318—341 |
| 3,062,979 | 11/62 | Jarret et al. | 310—168 |
| 3,091,728 | 5/63 | Hogan et al. | 318—138 |

ORIS L. RADER, *Primary Examiner.*